US012347309B2

(12) United States Patent
Iken

(10) Patent No.: US 12,347,309 B2
(45) Date of Patent: Jul. 1, 2025

(54) METHOD FOR PROVIDING A TRAFFIC LANE LOCALIZATION FOR A MOTOR VEHICLE IN A REGION OF AN INFRASTRUCTURE DEVICE

(71) Applicant: Volkswagen Aktiengesellschaft, Wolfsburg (DE)

(72) Inventor: Timo Iken, Wittingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 189 days.

(21) Appl. No.: 18/116,787

(22) Filed: Mar. 2, 2023

(65) Prior Publication Data

US 2023/0282100 A1 Sep. 7, 2023

(30) Foreign Application Priority Data

Mar. 3, 2022 (DE) ......................... 102022202165.7

(51) Int. Cl.
*G08G 1/01* (2006.01)
*G08G 1/0967* (2006.01)

(52) U.S. Cl.
CPC ......... *G08G 1/0116* (2013.01); *G08G 1/0125* (2013.01); *G08G 1/096741* (2013.01); *G08G 1/096783* (2013.01)

(58) Field of Classification Search
None
See application file for complete search history.

(56) References Cited

U.S. PATENT DOCUMENTS

2014/0365109 A1 12/2014 You et al.
2015/0010212 A1* 1/2015 Segarra ............ G08G 1/096783 382/104

(Continued)

FOREIGN PATENT DOCUMENTS

DE 102009060600 A1 6/2011
DE 102013221497 A1 12/2014

(Continued)

OTHER PUBLICATIONS

German Appln. No. DE 102022202165.7. Examination Report (Sep. 1, 2022).

*Primary Examiner* — Hongye Liang
(74) *Attorney, Agent, or Firm* — Peter Zura; LOZA & LOZA, LLP

(57) ABSTRACT

Technologies and techniques for providing a traffic lane localization for a motor vehicle in a region of an infrastructure device and to the motor vehicle. An infrastructure message is received, including at least one portion of traffic lane count information that describes a number of traffic lanes in the region of the infrastructure device. A portion of environment information is provided, which describes an environment of the motor vehicle in the region of the infrastructure device. A portion of adjacent traffic lane information is determined, which describes a number and relative arrangement of adjacent traffic lanes by evaluating the provided environment information. A portion of traffic lane localization information is determined, which describes how the ego traffic lane is localized relative to the adjacent traffic lane by evaluating the received infrastructure message and the determined adjacent traffic lane information. The determined traffic lane localization information is then provided.

20 Claims, 2 Drawing Sheets

(56) References Cited

U.S. PATENT DOCUMENTS

| | | | |
|---|---|---|---|
| 2017/0160743 A1 | 6/2017 | Schweikl | |
| 2018/0257615 A1 | 9/2018 | Rawashdeh et al. | |
| 2020/0217972 A1 | 7/2020 | Kim et al. | |
| 2021/0304433 A1* | 9/2021 | Huang | G01S 19/393 |

FOREIGN PATENT DOCUMENTS

| | | | |
|---|---|---|---|
| DE | 102013220430 | A1 | 4/2015 |
| DE | 102015206342 | A1 | 10/2015 |
| DE | 102015211279 | A1 | 12/2015 |
| DE | 102015224112 | A1 | 6/2017 |
| WO | 201776410 | A | 5/2017 |

* cited by examiner

METHOD FOR PROVIDING A TRAFFIC LANE LOCALIZATION FOR A MOTOR VEHICLE IN A REGION OF AN INFRASTRUCTURE DEVICE

RELATED APPLICATIONS

The present application claims priority to German Patent Application No. DE 102022 202165.7 filed Mar. 3, 2022, the contents of which is incorporated by reference in their entirety herein.

TECHNICAL FIELD

The present disclosure relates to technologies and techniques for providing a traffic lane localization for a motor vehicle in a region of an infrastructure device. The present disclosure furthermore relates to a motor vehicle for carrying out the disclosed technologies and techniques.

BACKGROUND

A motor vehicle can include at least one driver assistance system, which is configured to activate a longitudinal and/or lateral guidance of the motor vehicle. The driver assistance system is configured, for example, to carry out a lane change. The motor vehicle can furthermore include a navigation system, via which a driving route to a destination can be determined and provided in the motor vehicle. The driving route to the destination can be lane-dependent, for example, in particular when encompassing driving on a road that has multiple traffic lanes, of which only individual traffic lanes, for example, are available for turning and/or for driving straight ahead. For a successful route guidance along the driving route to the destination location and/or for a full functional capability of the driver assistance system, which can carry out the lane change, for example, it may therefore be necessary that a traffic lane-precise localization of the motor vehicle is present, that is, it is known on which traffic lane the motor vehicle is currently situated.

DE 10 2015 206 342 A1 shows a method for correcting a position of a vehicle using a global satellite navigation system for determining the ego position. In the process, a position detected via the global satellite navigation system is fitted into a digital map. This is carried out taking into consideration at least one object in an environment of the vehicle which is being identified and the position of which can be referenced in the digital map.

DE 10 2015 211 279 A1 shows a method for carrying out a plausibility check of position signals that were detected via a global satellite navigation system. In the process, objects in the environment of the vehicle are detected, and a plausibility check of the position signals is carried out by comparing the position of the objects to the ego position of the vehicle.

US 2018/0257615 A1 shows an automatic braking system for a vehicle. In this connection, it is described how a traffic light can be localized, wherein portions of position information of the traffic light are compared to position data of the vehicle, which were determined by way of a global navigation satellite system.

SUMMARY

Aspects of the present disclosure are directed to providing a solution by which a traffic lane localization for a motor vehicle can be reliably provided.

Aspects of the present disclosure are described the subject matter of the claims, listed below.

In some examples, a method is disclosed for providing a traffic lane localization for a motor vehicle in a region of an infrastructure device. The infrastructure device may be configured as a traffic light system wherein the system can include a single traffic light unit, that is, a single traffic light, or multiple traffic lights. As an alternative or in addition, the infrastructure device can be a construction site. Traffic lane localization shall be understood to mean a portion of information that describes on which traffic lane of multiple possible traffic lanes of a road the motor vehicle is situated. In this way, a localization takes place on an ego traffic lane on which the motor vehicle is situated, compared to other traffic lanes of the road, such as, for example, traffic lanes adjacent to the ego traffic lane. The traffic lane can alternatively be referred to as a driving lane.

In some examples, a motor vehicle is disclosed, wherein the motor vehicle is configured to carry out the methods according to the present disclosure. The motor vehicle may be configured as, e.g., a passenger car, a truck, a bus and/or a motorcycle. The motor vehicle is furthermore configured to carry out one of the exemplary embodiments or a combination of the exemplary embodiments.

In some examples, a control device is disclosed for the motor vehicle. The control device may include a processor unit, configured to carry out the methods according to the present disclosure, or an exemplary embodiment of the method according to the present disclosure, individually or in combination. The processor unit can include at least one microprocessor and/or at least one microcontroller and/or at least one field-programmable gate array (FPGA) and/or at least one digital signal processor (DSP) for this purpose. The processor unit can furthermore include program code, which is configured to carry out the method according to the present disclosure, or the exemplary embodiment of the method according to the present disclosure, individually or in combination with at least one other exemplary embodiment, when the program code is being executed by the processor unit. The program code can be stored in a data memory of the processor unit. The control device carries out the method steps of the method according to the present disclosure which are intended for the control device.

Aspects further include a computer program product, which can be a computer program, for example. The computer program product according to the present disclosure encompasses commands that, when the program is being executed by a computer, for example by the control device of the motor vehicle, prompt the computer to carry out the methods described herein, as well as individual or multiple exemplary embodiments of the method according to the present disclosure.

The present disclosure also encompasses refinements of the motor vehicle according to the present disclosure, of the control device and/or of the computer program product which include features such as have already been described in connection with the refinements of the method according to the present disclosure.

The present disclosure also encompasses the combinations of the features of the described embodiments.

BRIEF DESCRIPTION OF THE DRAWINGS

Exemplary embodiments of the present disclosure are described hereafter. In the drawings.

DETAILED DESCRIPTION

Figure 1:
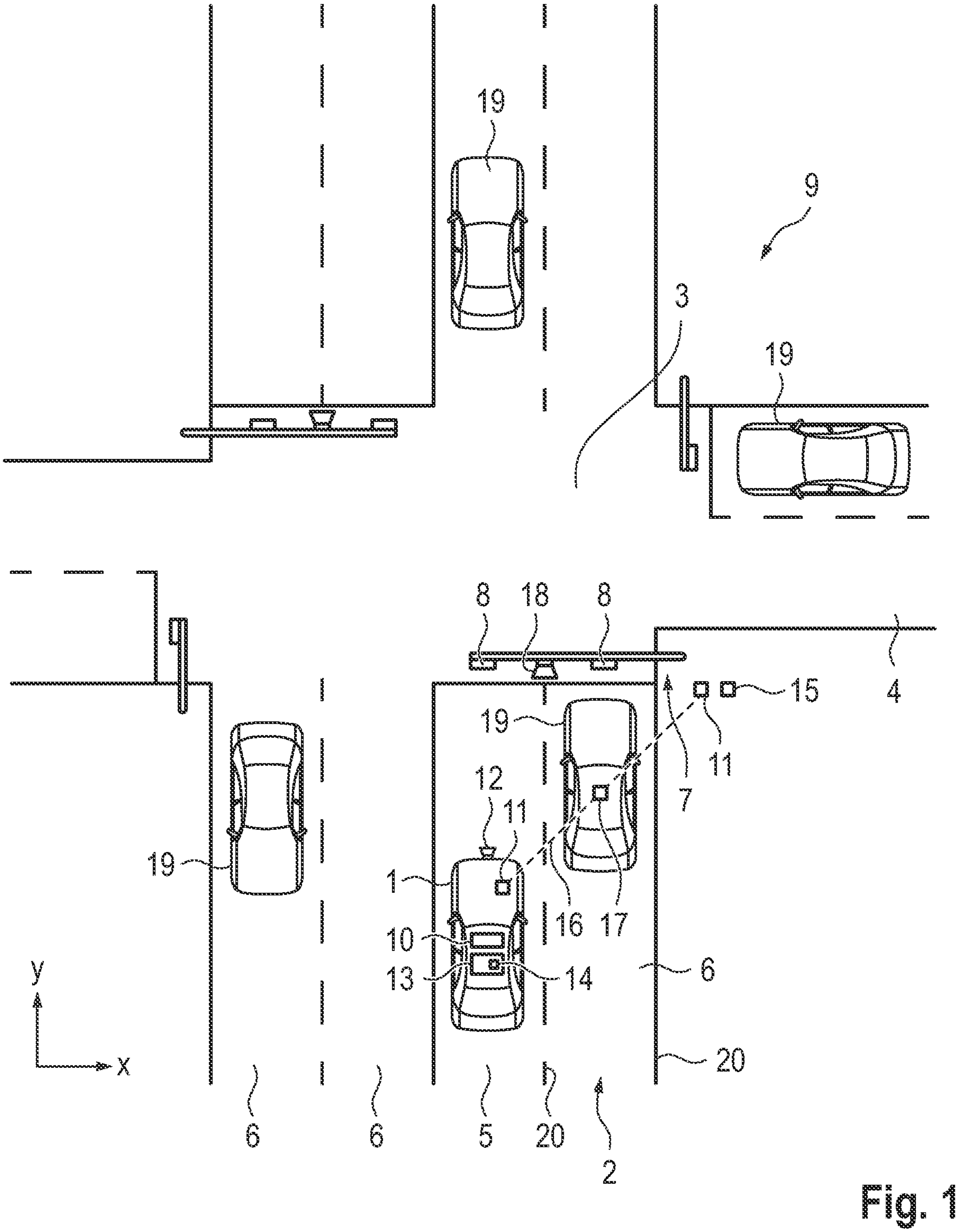
FIG. 1 shows a schematic representation of a motor vehicle in a region of an infrastructure device, according to some aspects of the present disclosure.

The exemplary embodiments described hereafter are preferred exemplary embodiments of the present disclosure. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

Aspects of the present disclosure are based on the finding that typically no detailed portions of information about, for example, a number of traffic lanes of the road are often times stored in a map for a road, which is provided to a navigation system of the motor vehicle. It is possible that such detailed portions of information are only stored for roads of a certain road type, such as, for example, the road type 'expressway'. Taking the map into consideration, the traffic lane localization for the motor vehicle can be carried out via portions of environment information detected by the motor vehicle, which describe the environment of the motor vehicle, if the number of traffic lanes of the road is stored in the map.

Aspects of the present disclosure are furthermore based on the finding that a positioning of the motor vehicle based on a global navigation satellite system (GNSS), for example based on a global positioning system (GPS), can have an imprecision of several meters, and consequently does not allow the motor vehicle to be localized with traffic lane precision. It has therefore been customary thus far to carry out the traffic lane localization for the motor vehicle based on the GNSS positioning, the map in the navigation system and/or the detected environment information. Taking the map into consideration, however, can be a complex and data-intensive process, in particular when the map is loaded only temporarily into the motor vehicle, for example by an external processing unit. It is therefore useful to resort to data provided by an infrastructure device, which describe the number of traffic lanes, for example, so as to be able to carry out the traffic lane localization in the motor vehicle in a simple manner that requires little processing.

An illustrative method as disclosed herein may be described as follows. An infrastructure message is received from the infrastructure device. The infrastructure message includes at least one portion of traffic lane count information, which describes a number of traffic lanes in the region of the infrastructure device. For example, if the infrastructure device is the traffic light system for an intersection at which two roads intersect that each have multiple traffic lanes, the infrastructure message can encompass the number of traffic lanes of the respective road, so that the received infrastructure message, which is received by the motor vehicle, describes, for example, that each of the two intersecting roads has a total of four traffic lanes. The region of the infrastructure device in this example is the region of the intersection at which the traffic light system is arranged. If the infrastructure device is a construction site, the region of the infrastructure device can encompass the entire area of the construction site or a portion of the area of the construction site, for example. The region of the infrastructure device is locally confined and, in the case of the intersection, is limited, for example, to road regions of the two intersecting roads that are arranged, for example, no more than 10 to 20 meters away from the traffic light system, and in particular the individual traffic lights of the traffic light system.

The infrastructure message can be transmitted by way of a cordless, in particular a wireless, communication link between the infrastructure device, and in particular a communication interface of the infrastructure device, and a communication interface of the motor vehicle. The communication link can, for example, be provided via a wireless local area network (WLAN), a Bluetooth connection and/or a mobile data network, for example based on the mobile communication standard Long Term Evolution (LTE), Long Term Evolution Advanced (LTE-A), fifth generation (5G) or sixth generation (6G).

In some examples, a portion of environment information may be provided. The portion of environment information describes an environment of the motor vehicle in the region of the infrastructure device and was detected via an environment detection device. The environment detection device can be an environment detection device of the motor vehicle, for example a camera, such as a front camera, a rear camera, a side camera and/or a 360-degree camera of the motor vehicle. The environment information is preferably present in the form of static or moving image data, which are detected and provided by the motor vehicle itself. The environment of the motor vehicle can, for example, be spatially delimited by a detection range of the environment detection device.

In some examples, a portion of adjacent traffic lane information may be determined by evaluating the provided environment information. The portion of adjacent traffic lane information describes a number and relative arrangement of adjacent traffic lanes with respect to an ego traffic lane on which the motor vehicle is situated. According to the adjacent traffic lane information, it is thus known how many traffic lanes are situated adjacent to the ego traffic lane, and how these are arranged relative to the ego traffic lane, that is, for example, how many adjacent traffic lanes are situated in each case to the left and to the right of the motor vehicle in a driving direction. The adjacent traffic lane information is purely determined from the environment information, that is, for example, based on the camera data of the camera of the motor vehicle. The adjacent traffic lane information can be determined by employing methods of image processing. For example, an object recognition can be carried out based on the environment information, during which, for example, traffic lane markings on a ground being driven on are recognized and evaluated, if these are described by the environment information.

Thereupon, a portion of traffic lane localization information is determined by evaluating the received infrastructure message, that is, at least the portion of traffic lane count information, and the determined portion of adjacent traffic lane information. The portion of traffic lane localization information describes how the ego traffic lane is localized relative to the adjacent traffic lanes. It is possible to establish, for example, on which traffic lane of the road in the region of the infrastructure device the motor vehicle is situated. To be able to determine the traffic lane localization information, it is not necessary, for example, to take into consideration a map, which is stored in a navigation system of the motor vehicle, and/or a portion of position information, which is detected via a position detection device of the motor vehicle and describes a position of the motor vehicle, for example in the form of coordinates. It is thus preferably provided that the traffic lane localization information is only determined by evaluating the received infrastructure message and the determined adjacent traffic lane information. In other words, the traffic lane localization information can be determined by only evaluating the received infrastructure message and by evaluating the environment information, that is, for example, the data detected via the camera of the motor vehicle.

In some examples, the determined traffic lane localization information may be provided. By providing the determined traffic lane localization information, the traffic lane localization for the motor vehicle in the region of the infrastructure device was thus provided. The individual method steps, in particular the determination of the adjacent traffic lane information and of the traffic lane localization information, can be carried out via a control device of the motor vehicle. The control device can be a processing unit, that is, a computer. Furthermore, the received infrastructure message and the environment information can be provided to the control device. Furthermore, the control device can provide the determined traffic lane localization, for example for another component of the motor vehicle, such as a control unit of a driver assistance system or the navigation system of the motor vehicle. As an alternative or in addition, it may be provided that the determined traffic lane localization is provided to other road users, such as, for example, another vehicle in the environment of the motor vehicle, and/or an external processing unit, for example via wireless vehicle-to-vehicle or vehicle-to-infrastructure communication.

Utilizing the technologies and techniques disclosed herein, a traffic lane localization for a motor vehicle can be reliably provided. A data memory-intensive and data transmission-intensive evaluation is additionally dispensed with since the traffic lane localization is possible without a map. Furthermore, the position determination based on GNSS, which is often times imprecise, is dispensed with. For the region of the infrastructure device, a particularly useful option is thus provided for localizing the motor vehicle on a traffic lane.

In some examples, the determined traffic lane localization information may be provided to a navigation system for the motor vehicle. The navigation system can be a component of the motor vehicle itself and/or be provided by a mobile terminal that is positioned in the motor vehicle. The mobile terminal can be a mobile telephone, such as, for example, a smart phone, and/or a tablet. As an alternative or in addition, the determined traffic lane localization information can be provided to a driver assistance system of the motor vehicle, for example a lane-keeping or lane change assistance system, that is, a driver assistance system for maintaining or changing the traffic lane at least in an assisted manner Based on the traffic lane localization information, for example, a current driving route of the motor vehicle, which is provided by the navigation system, can be specified, in particular when multiple traffic lanes are available, to which different driving directions and/or traffic rules apply.

Different traffic rules can be present, for example, when a traffic lane is intended for turning, that is, as a turn lane, and/or for driving straight ahead, and in particular only for turning or only for driving straight ahead. By providing the determined traffic lane localization information, it is ensured that, for example, a traffic lane change notice can be output at an early stage in the motor vehicle, so that the motor vehicle, in the region of the infrastructure device, can merge to a traffic lane suitable for the driving route to the destination. It may furthermore be made possible that the driver assistance system, for example, in an assisted, semi-automatic or even fully automatic manner, carries out a lane change or maintains the current traffic lane, depending on which is useful based on the traffic lane localization information. The traffic lane localization information is thus used in the motor vehicle in a manner that is particularly useful and comfortable for a user of the motor vehicle.

In some examples, the determined traffic lane localization information is only provided for a current trip of the motor vehicle. It may thus be provided that the traffic lane localization information is not, for example, intended for supplementing a map of the navigation system, but only for the current trip. The traffic lane localization information is thus used in the motor vehicle briefly and for a limited time. In this way, on the one hand, a possibly memory space-intensive storage of the traffic lane localization information in the motor vehicle can be prevented. On the other hand, it can thus be prevented that traffic lane localizations that are only temporarily possible, for example in the case of a temporary construction site, influence future trips during which such a traffic lane localization is no longer relevant at all, for example due to a change in the construction site. In this way, it is achieved that the method is carried out in an up-to-date manner at all times, and it is prevented that possible erroneously assumed portions of information regarding a traffic lane arrangement and count are stored in the motor vehicle.

Moreover, one exemplary embodiment can provide that the received infrastructure message includes at least one of the following portions of information: a portion of assignment information, a portion of operating state information, a portion of speed specification information, a portion of driving direction specification information, a portion of position description information, a portion of traffic lane marking kind information, a portion of traffic lane topology information and/or a portion of traffic situation information.

The portion of assignment information describes an assignment of the respective traffic lane to an infrastructure unit of the infrastructure device. The assignment may be carried out for each individual traffic light of a traffic light system that is composed of multiple individual traffic lights for respective traffic lanes. In this case, it may be thus known which subunit of the infrastructure device, that is, which infrastructure unit, is directly assigned to the particular traffic lane, that is, can provide a driving signal for the particular traffic lane, for example.

The portion of operating state information describes an operating state of the infrastructure unit and/or of the infrastructure device. In the case of a traffic light system, the operating state can describe, for example, a red, yellow or green phase of the individual traffic lights and/or of the entire traffic light system. In connection with a construction site, the operating state can distinguish, for example, whether or not the construction site is currently negotiable or whether or not an individual traffic lane is currently negotiable.

The portion of speed specification information describes a speed specification for a particular traffic lane. The speed specification is, for example, a maximum permissible speed on the particular traffic lane. The portion of driving direction specification information describes a driving direction specification for the particular traffic lane. The driving direction corresponds to the direction in which it is possible to drive on the particular traffic lane. For the ego traffic lane, the driving direction specification typically corresponds to the driving direction of the motor vehicle. In this way, a distinction can be made, for example, as to which traffic lanes are intended for traffic in the same driving direction as the motor vehicle, and which are intended for traffic in a direction opposite the driving direction of the motor vehicle. In this way, it can furthermore be evaluated from which direction the motor vehicle has to approach the infrastructure device for a localization on a certain traffic lane to be plausible. In the case of ambiguities, for example, it can be decided on which traffic lane the motor vehicle is actually located, if the portion of driving direction specification information is also evaluated as a possible portion of information of the received infrastructure message.

The portion of position description information provides a position description for the one respective traffic lane, the infrastructure unit and/or the infrastructure device. The position description is provided in the form of coordinates, for example. It is thus possible, for example, for position descriptions delimiting the particular traffic lane to be provided. Furthermore, a location of the individual infrastructure unit, for example of the individual traffic light, and/or of the overall infrastructure device may be known, wherein the position description of the infrastructure device, for example, covers the entire region of the infrastructure device.

The portion of traffic lane marking kind information describes a traffic lane marking type and/or a traffic lane marking color of the particular traffic lane. For example, the traffic lane marking type can distinguish between a solid line and a dotted line of a traffic lane marking on the ground being driven on. The traffic lane marking color can be white, for example. It may be provided that, if the traffic lane marking color is orange or yellow, this is considered an indication of a traffic lane marking within a construction site as the infrastructure device. Taking the traffic lane marking color into consideration, it is possible to consider traffic rules for changing between traffic lanes, for example if it is locally specified that a lane change is only permissible in the case of white traffic lane markings and is not permissible, for example, in the case of an orange or yellow traffic lane marking color.

The portion of traffic lane topology information describes a traffic lane topology for the particular traffic lane. For example, the traffic lane topology relates to a width of the traffic lane, a surface condition of the traffic lane and/or a geometric progression of the traffic lane, that is, for example, whether the traffic lane has a curved or rectilinear progression. The portion of traffic situation information describes a current traffic situation in the region of the infrastructure device and was detected via a traffic detection device of the infrastructure device. Traffic situation information is present, for example, in the form of image data, which are detected via a camera, serving as the traffic detection device, which is arranged, for example, in physical proximity to a traffic light of the traffic light system. The portion of traffic situation information can, for example, include an image in which the motor vehicle itself is depicted on the ego traffic lane thereof.

In general, the aforementioned portions of information, if these are included by the infrastructure message, can also be evaluated during the determination of the portion of traffic lane localization information, that is, be used for localizing the ego traffic lane relative to the adjacent traffic lanes. Overall, numerous additional portions of information can thus be received by way of the infrastructure message, which can render the determination of the traffic lane localization information even more precise.

In some examples, in the event that the received infrastructure message includes the traffic lane marking information and/or the traffic lane topology information provides that the same, that is, that the traffic lane marking information and/or the traffic lane topology information, are evaluated for a plausibility check of the environment detection device. Thus, ultimately, the environment information, which describes the environment of the motor vehicle and is detected via the environment detection device, is compared to the portions of information about the traffic lanes situated in the environment of the motor vehicle, wherein the traffic lane marking kind, that is, the traffic lane marking color and/or the traffic lane marking type, and/or the traffic lane topology are taken into consideration in the process.

If the plausibility check is successful, that is, if, for example, an appearance of the traffic lane marking described by the environment information corresponds to the specifications regarding the appearance, which can be derived from the traffic lane marking kind information and/or the traffic lane topology information, the plausibility check is considered to have been successfully conducted. If the plausibility check is successful, the environment detection device is considered to be functional. If the plausibility check is not successful, that is, if differences exist between the traffic lane marking as it was detected via the environment detection device, and the portions of information, encompassed by the infrastructure message, regarding the traffic lane marking kind and/or the topology of the traffic lane, the environment detection device can be considered as not functional, and thus as inoperable. Via the plausibility check, a control instance can thus be provided, via which a not fully or not reliably functioning environment detection device can be identified. This increases the reliability of the environment information that is detected via the environment detection device for the motor vehicle.

In some examples, a format adaptation may be executed for the determination of the traffic lane localization information. As a result of the format adaptation, a format of the infrastructure message is adapted to a format of a map for a motor vehicle. However, in this way it can be achieved that, even though the traffic lane is not shown in the map, the localization of the traffic lane on which the motor vehicle is situated can nonetheless be carried out using methods or algorithms known thus far, since the format adaptation of the infrastructure message is carried out.

In some examples, a check may be carried out, before the traffic lane localization information is determined, as to whether a map is provided in the motor vehicle. The number of traffic lanes, at least for the region of the infrastructure device, is plotted in the map. If the map is provided, the provided map is taken into consideration during the determination of the traffic lane localization information. The method can thus not only be based on the evaluation of the received infrastructure message and the determined adjacent traffic lane information, but additionally, for example, the determined traffic lane localization information can be checked based on the map. The method thus becomes particularly robust with respect to potential erroneous detections and erroneous determinations.

In some examples, if the described map is provided, the traffic lane localization information may be determined by only evaluating the provided map and the provided adjacent traffic lane information. It is assumed in this example that, before the traffic lane localization information is determined, it is checked whether the map, in which the number of traffic lanes is plotted at least for the region of the infrastructure device, is provided in the motor vehicle. In this case, a possibly complex evaluation of the received infrastructure message to be able to determine the traffic lane localization information may be dispensed with, and it is possible, directly proceeding from the map and taking into consideration the determined adjacent traffic lane information, which is determined from the environment information, to determine the traffic lane localization information. As a result, it may not be necessary to resort to the infrastructure message. The method according to the present disclosure is also suitable for this case.

In some examples, the infrastructure message may be configured as a map data message. The map data message is typically referred to as a MAP message, which is derived from the word 'map'. As an alternative or in addition, the infrastructure message can be a Signal Phase and Timing (SPaT) message. In this way, it is possible to resort to two common types of messages of infrastructure devices, which are typically provided by infrastructure devices and are thus standardized, so that the received infrastructure message can be used particularly easily and with little effort for further evaluation and determination steps.

A respective portion of information within the meaning of the present disclosure can be represented in the form of data. The traffic lane count information can thus, alternatively, be referred to as traffic lane count data, the environment information can be referred to as environment data, the adjacent traffic lane information as adjacent traffic lane data, the traffic lane localization information as traffic lane localization data, the assignment information as assignment data, the operating state information as operating state data, the speed specification information as speed specification data, the driving direction specification information as driving direction specification data, the position description information as position description data, the traffic lane marking kind information as traffic lane marking kind data, the traffic lane topology information as traffic lane topology data and/or the traffic situation information as traffic situation data.

Turning to FIG. 1, the drawing illustrates a motor vehicle 1, which is driving on a road 2 in an area of an intersection 3 according to some aspects of the present disclosure. Two roads 2 intersect at the intersection 3, of which one road 2 has four lanes and the other has two lanes. The two roads 2 in each case have different traffic lanes 4. The motor vehicle 1 is driving on an ego traffic lane 5, which is one of the traffic lanes 4 of the road 2. In an x direction, which is situated perpendicularly to a driving direction (y direction) of the motor vehicle 1 here, the road 2 has three neighboring traffic lanes 4, which are referred to as adjacent traffic lanes 6. The adjacent traffic lane 6 situated to the right of the motor vehicle 1 in the x direction is configured for the same driving direction as that in which the motor vehicle 1 is driving. The other two adjacent traffic lanes 6, which are situated to the left of the motor vehicle 1 in the x direction, have a driving direction that is opposite this driving direction.

An infrastructure device 7, which is configured as a traffic light system here by way of example, is arranged at the intersection 3. The infrastructure device 7 includes multiple infrastructure units 8, which here, by way of example, are individual traffic lights of the traffic light system. An individual infrastructure unit 8, that is, an individual traffic light, can be provided for each individual traffic lane 4, for example.

The infrastructure device 7 in the area of the intersection 3 has a region 9, wherein this region 9 here includes at least the four outlined carriers including individual traffic lights, serving as the respective infrastructure units 8. Here, the area of the intersection 3 is the region 9 of the infrastructure device 7.

The motor vehicle 1 includes a control device 10. The control device 10 is configured as a processing unit, which includes at least one microprocessor and/or microcontroller, for example. The motor vehicle 1 also includes a communication interface 11. The motor vehicle 1 can furthermore include an environment detection device 12, which is configured here, by way of example, as a front camera of the motor vehicle 1. An environment of the motor vehicle 1 can be detected via the environment detection device 12, wherein the environment is established by a detection range of the environment detection device 12. The motor vehicle 1 can moreover include a navigation system 13, which includes a map 14. For example, a driving route for the motor vehicle 1 to a destination location can be predefined via the navigation system 13. The map 14 can be stored in the motor vehicle 1 and/or be received from an external processing unit, for example via the communication interface 11 of the motor vehicle 1.

The infrastructure device 7 can include a control unit 15 and the communication interface 11. The control unit 15 can prompt data to be transmitted, such as an infrastructure message 17 here, via a communication link 16 between the communication interface 11 of the infrastructure device 7 and the communication interface 11 of the motor vehicle 1. The motor vehicle 1 can receive the infrastructure message 17 from the infrastructure device 7.

The infrastructure device 7 can include a traffic detection device 18, which here is configured as a camera for traffic monitoring and via which, for example, a current traffic situation in the region 9 of the infrastructure device 7 can be detected and provided.

FIG. 1 furthermore outlines additional road users, and more particularly additional vehicles 19, which are present in the environment of the motor vehicle 1 and/or in the region 9 of the infrastructure device 7. Furthermore, traffic lane markings 20 are present between the individual traffic lanes 4 of the road 2, which can be configured as a dotted line or as a solid line.

Figure 2:
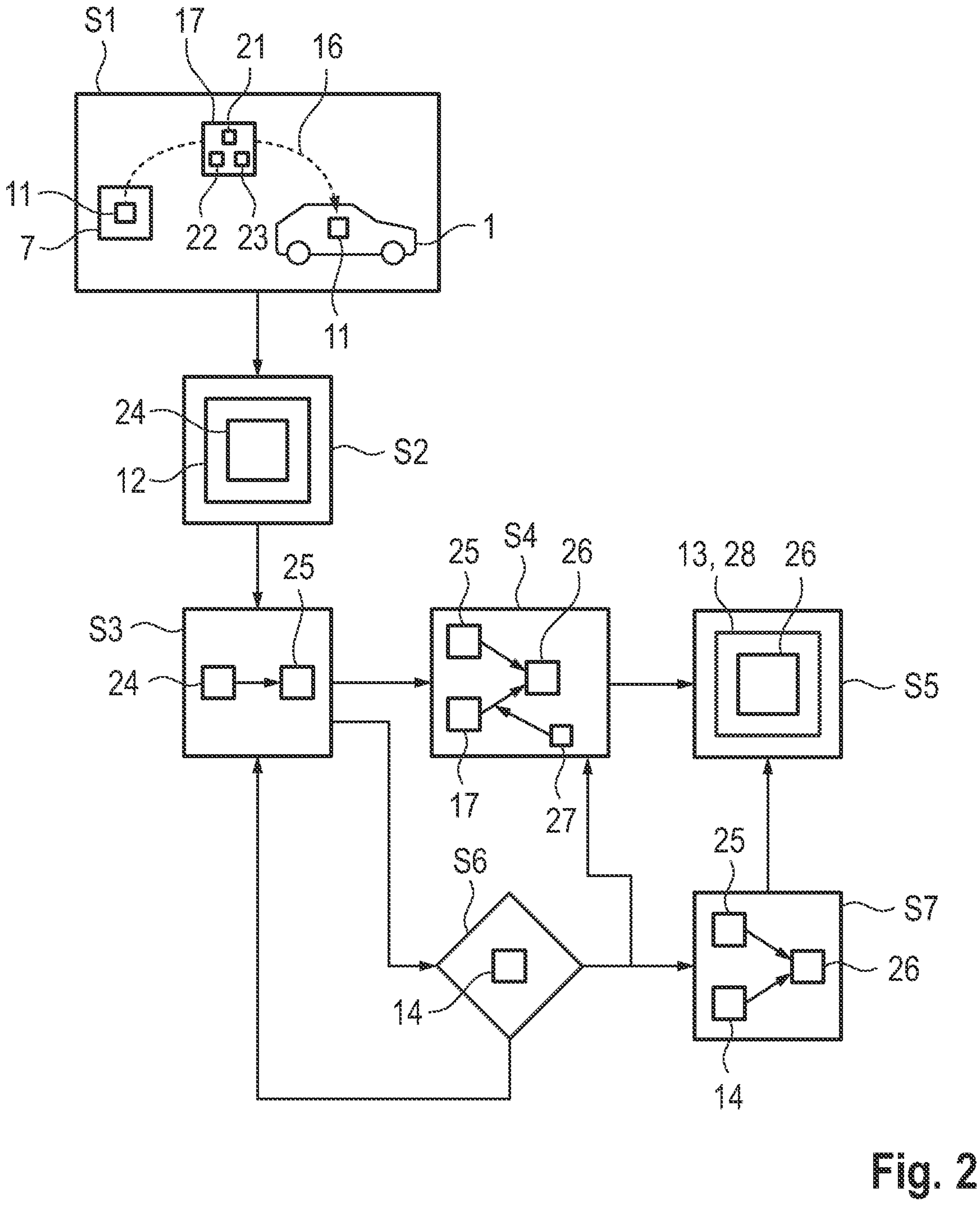
FIG. 2 shows a schematic representation of a signal flow chart for a method for providing a traffic lane localization for a motor vehicle in a region of an infrastructure device, according to some aspects of the present disclosure.

FIG. 2 outlines individual method steps of a method for providing a traffic lane localization for a motor vehicle 1 in the region 9 of the infrastructure device 7. In a method step S1, the infrastructure message 17 which is provided by the infrastructure device 7 is received. The motor vehicle 1, and in particular the communication interface 11 of the motor vehicle 1, receives the infrastructure message 17. The infrastructure message 17 includes at least one portion of traffic lane count information 21. The traffic lane count information 21 describes a number of traffic lanes 4 in the region 9 of the infrastructure device 7, that is, the number four for the total of four traffic lanes 4 in the example outlined in FIG. 1.

In addition to the traffic lane count information 21, the infrastructure message 17 can include further portions of information. Purely by way of example, a portion of traffic lane marking kind information 22 and a portion of traffic lane topology information 23 are outlined here as such further portions of information. The traffic lane marking kind information 22 describes a traffic lane marking type, for example dotted or solid, and/or a traffic lane marking color of the particular traffic lane 4, for example white, orange, yellow or another color. The traffic lane topology information 23 describes a traffic lane topology of the particular traffic lane 4, for example the width, progression and/or surface thereof.

As an alternative or in addition, the infrastructure message 17 can include a portion of assignment information, which describes an assignment of the particular traffic lane 4 to the infrastructure unit 8 of the infrastructure device 7, a portion of operating state information, which describes an operating state of the infrastructure unit 8 and/or of the infrastructure device 7, a portion of speed specification information, which describes a speed specification in the particular traffic lane 4, a portion of driving direction specification information, which describes a driving direction specification for a respective traffic lane 4, a position description information, which provides a position description for the particular traffic lane 4 and/or the infrastructure unit 8 and/or the infrastructure device 7, and/or a portion of traffic situation information, which describes a current traffic situation in the region 9 of the infrastructure device 7 and was detected via the traffic detection device 18 of the infrastructure device 7.

The infrastructure message 17 can, for example, be provided as a map data message (MAP message) and/or as a Signal Phase and Timing message.

Another method step S2 involves providing a portion of environment information 24. The environment information 24 describes the environment of the motor vehicle 1 in the region 9 of the infrastructure device 7 and was detected via the environment detection device 12. The environment detection device 12 here is a component of the motor vehicle 1. As an alternative or in addition, the environment information 24 can be provided by another vehicle 19, for example via vehicle-to-vehicle communication.

In a method step S3, a portion of adjacent traffic lane information 25 is determined, which describes a number and relative arrangement of the adjacent traffic lanes 6 with respect to the ego traffic lane 5 on which the motor vehicle 1 is situated. The adjacent traffic lane information 25 is determined by evaluating the provided environment information 24.

In a method step S4, a portion of traffic lane localization information 26 is determined. The traffic lane localization information 26 describes how the ego traffic lane 5 is localized relative to the adjacent traffic lanes 6. The traffic lane localization information 26 is determined by evaluating the received infrastructure message 17 and the determined adjacent traffic lane information 25. As soon as the traffic lane localization information 26 has been determined, the determined traffic lane localization information 26 can be provided in a method step S5. For this purpose, the information can, for example, be provided to the navigation system 13 for the motor vehicle 1 and/or a driver assistance system 28 of the motor vehicle 1.

The infrastructure message 17 is preferably received via the communication interface 11. The environment information 24 is preferably provided via the environment detection device 12, wherein the environment information 24 is provided to the control device 10 of the motor vehicle 1. The determination of the adjacent traffic lane information 25 as well as of the traffic lane localization information 26 and the provision thereof, that is, ultimately method steps S3 to S5, preferably takes place via the control device 10 of the motor vehicle 1.

It may be provided that the determined traffic lane localization information 26 is only provided for a current trip of the motor vehicle 1. This means that it is not stored long-term, but only temporarily.

It may be provided that the received infrastructure message 17, if the message includes the traffic lane topology information 23 and/or the traffic lane marking kind information 22, is evaluated for a plausibility check of the environment detection device 12. In the process, the traffic lane marking kind information 22 and/or the traffic lane topology information 23 is taken into consideration. If the plausibility check is successful, the environment detection device 12 is considered to be functional.

In some examples, method step S4 may include that a format adaptation 27 is carried out for the determination of the traffic lane localization information 26, by which a format of the infrastructure message 17 is adapted to a format of the map 14 for the motor vehicle 1, for example so as to be able to resort to existing algorithms for determining the traffic lane localization information 26.

In some examples, prior to method step S4, it is checked in a method step S6 whether the map 14, in which the number of traffic lanes 4 is plotted at least for the region 9 of the infrastructure device 7, is provided in the motor vehicle 1. This means that, when the map 14 is provided, the provided map 14 can be taken into consideration during the determination of the traffic lane localization information 26, that is, in method step S4. Alternatively, it may be provided that, if the map 14 is provided, the traffic lane localization information 26 is determined by only evaluating the provided map 14 and the provided adjacent traffic lane information 25. This takes place in a method step S7. The method can thereupon proceed to method step S5. If the check in method step S6 is unsuccessful, it is possible, for example, to switch back to method step S3 and/or the following method step S4.

Overall, the examples show the use of infrastructure messages, that is, MAP messages, for self-localization, based on vehicle-to-infrastructure communication. The present disclosure provides for the use of the vehicle-to-infrastructure messages, that is, the infrastructure message 17, is used instead of the navigation map, that is, the map 14, as the map for comparing the lanes with the camera, that is, the data of the environment detection device 12. For this purpose, the matching algorithm is either adapted so as to also be able to process an infrastructure message 17, instead of the navigation map, that is, the map 14, as the input, or, alternatively, to convert the infrastructure message 17 in such a way that the message has the same format as the map 14, wherein the format adaptation 27 is resorted to for this purpose. Ultimately, the infrastructure message 17 and the map 14 contained therein are thus used for the self-localization. Portions of lane information, that is, the traffic lane count information 21 in the infrastructure message 17, are thus used for determining the ego driving lane, that is, the ego traffic lane 5.

LIST OF REFERENCE NUMERALS

1 motor vehicle
2 road
3 intersection
4 traffic lane
5 ego traffic lane
6 adjacent traffic lane
7 infrastructure device
8 infrastructure unit
9 region
10 control device
11 communication interface
12 environment detection device
13 navigation system
14 map
15 control unit 16 communication link
17 infrastructure message
18 traffic detection device
19 vehicle
20 traffic lane marking
21 traffic lane count information
22 traffic lane marking kind information
23 traffic lane topology information
24 environment information
25 adjacent traffic lane information
26 traffic lane localization information
27 format adaptation
28 driver assistance system
S1 to S7 method steps

The invention claimed is:

1. A method for providing a traffic lane localization for a motor vehicle in a region of an infrastructure device, comprising:

receiving, via a communication interface of the motor vehicle, an infrastructure message comprising at least one portion of traffic lane count information and at least one of traffic lane marking information characterizing a traffic lane marking or a traffic lane marking color, or traffic lane topology information characterizing a traffic lane topology, the traffic lane count information, representing a number of traffic lanes in the region of the infrastructure device;

providing a portion of environment information representing an environment of the motor vehicle in the region of the infrastructure device, the portion of environment information detected via an environment detection device of the motor vehicle;

determining, using image processing executed by a processor of the motor vehicle, a portion of adjacent traffic lane information by analyzing the provided environment information, the adjacent traffic lane information representing a number and relative arrangement of adjacent traffic lanes with respect to an ego traffic lane on which the motor vehicle is situated;

determining, using data evaluation executed by the processor, a portion of traffic lane localization information by algorithmically combining only the received infrastructure message and the determined adjacent traffic lane information, the traffic lane localization information representing how the ego traffic lane is localized relative to the adjacent traffic lanes;

performing, using the processor, a plausibility check of the environment detection device by evaluating the traffic lane marking information or the traffic lane topology information included in the received infrastructure message against the portion of environment information, and determining that the environment detection device is functional when the plausibility check is successful;

providing the determined traffic lane localization information to a navigation system of the motor vehicle and/or to a driver assistance system of the motor vehicle, provided the plausibility check is successful; and modifying, via the driver assistance system of the motor vehicle, at least one of a lane-keeping control operation by adjusting vehicle steering based on the determined traffic lane localization information, an automated lane-change operation by executing a lane change maneuver based on the determined traffic lane localization information, or a warning output generated by the driver assistance system to a vehicle operator based on the determined traffic lane localization information to facilitate a lane-keeping control operation or an automated lane-change operation.

2. The method according to claim 1, wherein providing the determined traffic lane localization information comprises providing the determined traffic lane localization information only for a current trip of the motor vehicle.

3. The method according to claim 1, wherein the received infrastructure message comprises at least one of:

a portion of assignment information, which characterizes an assignment of the particular traffic lane to an infrastructure unit of the infrastructure device, a portion of operating state information, which characterizes an operating state of the infrastructure unit and/or of the infrastructure device, a portion of speed specification information, which characterizes a speed specification in the particular traffic lane, a portion of driving direction specification information, which characterizes a driving direction specification for the particular traffic lane, a portion of position description information, which characterizes a position description for the particular traffic lane and/or the infrastructure unit and/or the infrastructure device, or a portion of traffic situation information, which characterizes a current traffic situation in the region of the infrastructure device and was detected via a traffic detection device of the infrastructure device.

4. The method according to claim 1, wherein performing the plausibility check further comprises determining an error threshold for the environment detection device based on the evaluation of the traffic lane marking information or the traffic lane topology information against the portion of environment information, and determining that the environment detection device is functional when a discrepancy in the evaluation is within the error threshold.

5. The method according to claim 1, further comprising executing a format adaptation for determining the traffic lane localization information, in which a format of the infrastructure message is adapted to a format of a map of the motor vehicle to facilitate integration with the navigation system.

6. The method according to claim 1, further comprising utilizing a map of the motor vehicle, in which the number of traffic lanes is plotted at least for the region of the infrastructure device, to validate the determined traffic lane localization information after the data evaluation.

7. The method according to claim 6, wherein utilizing the map comprises analyzing the map and the determined traffic lane localization information to confirm the localization of the ego traffic lane relative to the adjacent traffic lanes.

8. The method according to claim 1, wherein the infrastructure message comprises at least one of a MAP message characterizing traffic lane topology or a Signal Phase and Timing message characterizing signal timing.

9. A control device for providing a traffic lane localization for a motor vehicle in a region of an infrastructure device, comprising:

a memory; and a processor unit, operatively coupled to the memory, the processor unit being configured to:

receive, via a communication interface of the motor vehicle, an infrastructure message comprising at least one portion of traffic lane count information and at least one of traffic lane marking information characterizing a traffic lane marking or a traffic lane marking color, or traffic lane topology information characterizing a traffic lane topology, the traffic lane count information representing a number of traffic lanes in the region of the infrastructure device;

provide a portion of environment information representing an environment of the motor vehicle in the region of the infrastructure device, the portion of environment information detected via an environment detection device of the motor vehicle;

determine, using image processing executed by the processor unit, a portion of adjacent traffic lane information by analyzing the provided environment information, the adjacent traffic lane information representing a number and relative arrangement of adjacent traffic lanes with respect to an ego traffic lane on which the motor vehicle is situated;

determine, using data evaluation executed by the processor unit, a portion of traffic lane localization information by algorithmically combining only the received infrastructure message and the determined adjacent traffic lane information, the traffic lane localization information representing how the ego traffic lane is localized relative to the adjacent traffic lanes;

perform a plausibility check of the environment detection device by evaluating the traffic lane marking information or the traffic lane topology information included in the received infrastructure message against the portion of environment information, and determine that the environment detection device is functional when the plausibility check is successful;

provide the determined traffic lane localization information to a navigation system of the motor vehicle and/or to a driver assistance system of the motor vehicle, provided the plausibility check is successful; and modify, via the driver assistance system of the motor vehicle, at least one of a lane-keeping control operation by adjusting vehicle steering based on the determined traffic lane localization information, an automated lane-change operation by executing a lane change maneuver based on the determined traffic lane localization information, or a warning output generated by the driver assistance system to a vehicle operator based on the determined traffic lane localization information to facilitate a lane-keeping control operation or an automated lane-change operation.

10. The control device according to claim 9, wherein the processor unit is configured to provide the determined traffic lane localization information by providing the determined traffic lane localization information only for a current trip of the motor vehicle.

11. The control device according to claim 9, wherein the received infrastructure message further comprises at least one of:

a portion of assignment information, which characterizes an assignment of the particular traffic lane to an infrastructure unit of the infrastructure device;

a portion of operating state information, which characterizes an operating state of the infrastructure unit and/or of the infrastructure device;

a portion of speed specification information, which characterizes a speed specification in the particular traffic lane;

a portion of driving direction specification information, which characterizes a driving direction specification for the particular traffic lane;

a portion of position description information, which characterizes a position description for the particular traffic lane and/or the infrastructure unit and/or the infrastructure device; or a portion of traffic situation information, which characterizes a current traffic situation in the region of the infrastructure device and was detected via a traffic detection device of the infrastructure device.

12. The control device according to claim 9, wherein the processor unit is configured to perform the plausibility check by determining an error threshold for the environment detection device based on the evaluation of the traffic lane marking information or the traffic lane topology information against the portion of environment information, and determining that the environment detection device is functional when a discrepancy in the evaluation is within the error threshold.

13. The control device according to claim 9, wherein the processor unit is configured to execute a format adaptation for determining the traffic lane localization information, in which a format of the infrastructure message is adapted to a format of a map of the motor vehicle to facilitate integration with the navigation system.

14. The control device according to claim 9, wherein the processor unit is configured to utilize a map of the motor vehicle, in which the number of traffic lanes is plotted at least for the region of the infrastructure device, to validate the determined traffic lane localization information after the data evaluation.

15. The control device according to claim 14, wherein the processor unit is configured to utilize the map by analyzing the map and the determined traffic lane localization information to confirm the localization of the ego traffic lane relative to the adjacent traffic lanes.

16. The control device according to claim 9, wherein the infrastructure message comprises at least one of a MAP message characterizing traffic lane topology or a Signal Phase and Timing (SPaT) message characterizing signal timing.

17. A non-transitory computer-readable medium including program code stored thereon, configured for providing a traffic lane localization for a motor vehicle in a region of an infrastructure device, the program code, when executed by a processor, causes the processor to:

receive, via a communication interface of the motor vehicle, an infrastructure message comprising at least one portion of traffic lane count information and at least one of traffic lane marking information characterizing a traffic lane marking or a traffic lane marking color, or traffic lane topology information characterizing a traffic lane topology, the traffic lane count information representing a number of traffic lanes in the region of the infrastructure device;

provide a portion of environment information representing an environment of the motor vehicle in the region of the infrastructure device, the portion of environment information detected via an environment detection device of the motor vehicle;

determine, using image processing executed by the processor, a portion of adjacent traffic lane information by analyzing the provided environment information, the adjacent traffic lane information representing a number and relative arrangement of adjacent traffic lanes with respect to an ego traffic lane on which the motor vehicle is situated;

determine, using data evaluation executed by the processor, a portion of traffic lane localization information by algorithmically combining only the received infrastructure message and the determined adjacent traffic lane information, the traffic lane localization information representing how the ego traffic lane is localized relative to the adjacent traffic lanes;

perform a plausibility check of the environment detection device by evaluating the traffic lane marking information or the traffic lane topology information included in the received infrastructure message against the portion of environment information, and determine that the environment detection device is functional when the plausibility check is successful;

provide the determined traffic lane localization information to a navigation system of the motor vehicle and/or to a driver assistance system of the motor vehicle, provided the plausibility check is successful; and modify, via the driver assistance system of the motor vehicle, at least one of a lane-keeping control operation by adjusting vehicle steering based on the determined traffic lane localization information, an automated lane-change operation by executing a lane change maneuver based on the determined traffic lane localization information, or a warning output generated by the driver assistance system to a vehicle operator based on the determined traffic lane localization information to facilitate a lane-keeping control operation or an automated lane-change operation.

18. The non-transitory computer-readable medium according to claim 17, wherein the program code, when executed by the processor, causes the processor to: provide the determined traffic lane localization information by providing the determined traffic lane localization information only for a current trip of the motor vehicle.

19. The non-transitory computer-readable medium according to claim 17, wherein the received infrastructure message further comprises at least one of:

a portion of assignment information, which characterizes an assignment of the particular traffic lane to an infrastructure unit of the infrastructure device;

a portion of operating state information, which characterizes an operating state of the infrastructure unit and/or of the infrastructure device;

a portion of speed specification information, which characterizes a speed specification in the particular traffic lane;

a portion of driving direction specification information, which characterizes a driving direction specification for the particular traffic lane;

a portion of position description information, which characterizes a position description for the particular traffic lane and/or the infrastructure unit and/or the infrastructure device; or a portion of traffic situation information, which characterizes a current traffic situation in the region of the infrastructure device and was detected via a traffic detection device of the infrastructure device.

20. The non-transitory computer-readable medium according to claim 17, wherein the program code, when executed by the processor, causes the processor to: execute a format adaptation for determining the traffic lane localization information, in which a format of the infrastructure message is adapted to a format of a map of the motor vehicle to facilitate integration with the navigation system.

* * * * *